(12) United States Patent
Hellmann

(10) Patent No.: US 11,451,022 B2
(45) Date of Patent: Sep. 20, 2022

(54) EXPLOSION-PROTECTED DEVICE

(71) Applicant: Pepperl + Fuchs SE, Mannheim (DE)

(72) Inventor: Michael Hellmann, Mannheim (DE)

(73) Assignee: Pepperl + Fuchs SE, Mannheim (DE)

( * ) Notice: Subject to any disclaimer, the term of this patent is extended or adjusted under 35 U.S.C. 154(b) by 0 days.

(21) Appl. No.: 17/191,097

(22) Filed: Mar. 3, 2021

(65) Prior Publication Data

US 2021/0281053 A1 Sep. 9, 2021

(30) Foreign Application Priority Data

Mar. 5, 2020 (DE) ...................... 10 2020 106 044.0

(51) Int. Cl.
*H02G 3/04* (2006.01)

(52) U.S. Cl.
CPC ................................ *H02G 3/0406* (2013.01)

(58) Field of Classification Search
CPC ...... H02G 3/088; H02G 3/0406; H02G 15/04; H02G 3/22; H01B 7/292; H01B 3/12; H01B 7/28; H01B 7/29; H01B 7/295; H01B 1/00; H01B 1/24; H01B 13/0033; H01B 7/288
USPC ......... 174/59, 17 R, 53, 11 BH, 14 BH, 15.5
See application file for complete search history.

(56) References Cited

U.S. PATENT DOCUMENTS

| | | | | |
|---|---|---|---|---|
| 1,829,764 A * | 11/1931 | Sloane | ................... | H02G 3/088 384/129 |
| 1,904,617 A * | 4/1933 | Buchanan | .............. | H02G 3/088 285/341 |
| 2,711,438 A * | 6/1955 | Bissell | ................... | H02G 3/088 174/18 |
| 3,761,601 A * | 9/1973 | Kaesser | ............... | H01B 17/306 174/665 |
| 3,838,518 A * | 10/1974 | Hendrickson | ....... | G01F 23/0023 324/171 |
| 5,159,233 A * | 10/1992 | Sponseller | .............. | H01T 13/34 445/7 |
| 5,626,190 A * | 5/1997 | Moore | .................. | E21B 17/003 174/93 |
| 6,672,132 B1 * | 1/2004 | Weyl | .................... | G01N 27/407 73/23.31 |
| 8,845,361 B2 * | 9/2014 | Magno, Jr. | ........... | H02G 15/046 439/910 |
| 2011/0211978 A1 | 9/2011 | Dybdal | | |

(Continued)

FOREIGN PATENT DOCUMENTS

| | | |
|---|---|---|
| DE | 1515863 A1 | 7/1969 |
| DE | 3833370 A1 | 4/1990 |
| DE | 9105499 U1 | 10/1991 |

(Continued)

*Primary Examiner* — Krystal Robinson
(74) *Attorney, Agent, or Firm* — Smartpat PLC

(57) ABSTRACT

An explosion-protected device (1) comprises a deformable interior body (20) that comprises at least one line channel (30, 31) extending along a longitudinal axis (L) through the interior body (20) for a line. The line extends through the at least one line channel (30, 31). The interior body (20) is encompassed by a housing (2). The housing (2) is divided into an incoming section (3), an outgoing section (4) as well as a middle section (5) disposed between the incoming section (3) and the outgoing section (4). A spring element (25) is provided which is disposed in the middle section (5) and exerts pressure onto the interior body (20).

9 Claims, 4 Drawing Sheets

(56) References Cited

U.S. PATENT DOCUMENTS

2018/0226781 A1    8/2018  Semrau et al.

FOREIGN PATENT DOCUMENTS

| DE | 202004008882 U1 | 9/2004 |
| DE | 102014100492 A1 | 7/2015 |
| DE | 102015112284 A1 | 2/2017 |
| EP | 0490637 A1 | 6/1992 |
| EP | 0598136 A1 | 5/1994 |

* cited by examiner

EXPLOSION-PROTECTED DEVICE

TECHNICAL FIELD

The invention relates to an explosion-protected device through which one or more electrical or optical lines pass into an explosion-protected chamber.

BACKGROUND

Feeding electrical and/or optical conductors out of an atmosphere that is at risk of explosions into an explosion-protected chamber, for example within an explosion-protected housing, is complex and requires expenditures. To ensure that ignition punctures cannot reach from the explosion-protected chamber outwardly into the atmosphere that is at risk of explosion, EP 0 490 637 A1, for example, describes a cable gland assembly for a junction between a wall and a cable that comprises a sealing. The sealing is comprised of a ring having a rectangular cross section and a V-shaped groove running around the outer rim of the ring.

Furthermore, DE 10 2015 112 284 A1 describes an explosion-protected arrangement with a feed-through part that comprises a feedthrough aperture with a duct area. The arrangement comprises a deformable interior body that comprises at least one line channel extending in a longitudinal direction through the interior body with at least one conductor extending through the at least one line channel and comprising at least one electrical and/or optical conductor, wherein the interior body is encompassed in a circumferential direction by a connection sleeve about the longitudinal direction, which connection sleeve is comprised of a plastically deformable material and, due to plastic deformation of a connection section, presses said connection section inwardly onto the interior body, deforms the interior body and thereby connects it with the line under force closure, wherein the plastically reformed connection section comprises an outer section area, that has been reformed into a second boundary area, that forms with a feed-through area formed by the first boundary area an ignition puncture-proof ex gap or flame path.

EP 0 598 136 A1 furthermore describes a sealing structure for an aperture, developed for the feedthrough of a part, of a metal wall portion, in which aperture a part, provided for the connection of a facility disposed on one side of the wall portion with a facility disposed on the opposite side of the wall portion, is fed through the aperture drilled into the metal wall part, wherein the connection part is resistant against radial compression and its axial length is greater than the thickness of the metal wall portion, and in which a sealing part is provided for sealing the aperture. The sealing part is disposed between the feedthrough part and the interior wall surface of the aperture, wherein the sealing part has an outer diameter substantially equal to the inner diameter of the aperture and has an axial length that is equal to or greater than the thickness of the metal wall portion. In at least one of the openings located at the opposing ends of the aperture a diminution region is developed. By means of the diminution region the feedthrough part and the sealing part are compressed from their peripheral regions, wherein the sealing part is clamped into the aperture in order to seal the aperture thereby.

Lastly, DE 10 2014 100 492 A1 discloses a device for the dust ignition-proof feedthrough of a structural part through an opening in a wall of an explosion-protected housing. A deformable and/or formable sealing element is directly disposed into the opening of the wall. A clamping arrangement serves for clamping the sealing element against a clamping section of the wall, wherein the clamping section is diminished transversely to a feedthrough direction. To clamp the sealing element tight, the clamping arrangement exerts an axial clamping force onto the sealing element in the direction of the feedthrough. During this process the sealing element can at least become minimally deformed in the radial direction and comes to lie on the opening in the wall and on the structural part which is fed through the sealing element. This leads to a dust ignition-proof arrangement.

The problem inherent in the know solutions is that precisely at very low temperatures or under strong temperature fluctuations they do not offer any assurance that the sealing is completely in contact on the interior wall of the housing encompassing it.

SUMMARY

The present disclosure therefore addresses the problem of providing an explosion-protected device in which explosion protection is ensured even at low temperatures or under strong temperature fluctuations.

This problem is resolved according to the features as claimed. An explosion-protected device comprises a deformable interior body which comprises at least one line channel extending along a longitudinal axis through the interior body. Through this at least one line channel extends a line. The line can be an optical or electrical line. In a circumferential direction the interior body is encompassed by a housing along the longitudinal direction, wherein the housing comprises an incoming section for the at least one line, an outgoing section for the at least one line as well as an intermediately disposed middle section. The middle section is herein located at least partially outside of an explosion-protected region and the outgoing section is located within the explosion-protected region. In addition, the explosion-protective device comprises a spring element disposed in the middle section that continuously exerts pressure onto the interior body. Yet the pressure generated by the spring force is of high enough magnitude to deform the interior body. The spring element ensures thereby that the interior body is completely in contact on the interior wall of the encompassing housing as well as on the at least one line even at very low temperatures or under strong temperature fluctuations.

In a preferred embodiment a first supporting disk is provided with at least one feedthrough extending along the longitudinal axis of the housing for a line and a second supporting disk is provided with at least one feedthrough extending along the longitudinal axis for a line, wherein these two supporting disks surround the interior body along a transverse axis. The first supporting disk is herein disposed in the outgoing section and the second supporting disk is disposed in the intermediate section of the housing. These two supporting disks are not secured on the housing such that the two supporting disks are disposed within the housing such that they are displaceable along the longitudinal axis. The prestressed spring element herein exerts continuous pressure onto the second supporting disk and therewith also onto the interior body as well as onto the first supporting disk such that the spring element presses the two supporting disks as well as the interior body in the direction of the outgoing section. The pressure is herein of such magnitude that the deformation of the interior body is enabled. This ensures that at undesired deformations of the interior body—especially at low temperatures or under strong temperature fluctuations—the spring element presses the second supporting disk further onto the interior body whereby the interior body continues to remain completely in contact with the housing or with the supporting disks and consequently fills completely an inner volume between the two supporting disks and thus encompasses also the lines. It is understood that the spring force required for this purpose is a function of the material of the interior body. A person of skill in the art will therefore utilize for a specific material of the interior body such spring element as is capable of exerting sufficient pressure onto interior bodies in order to deform the interior body.

The at least one feedthrough of the second supporting disk and the at least one feedthrough of the first supporting disk as well as the at least one line channel of the interior body form a feedthrough channel through which the one line is fed. In the two supporting disks are preferably provided several feedthroughs and in the interior body several line channels that are disposed with respect to one another such that several feedthrough channels for one line each are formed. It is understood that in this case the number of line channels as well as the number of feedthroughs of the two supporting disks are identical.

In a further embodiment a mounting bolt for prestressing the spring element is provided, which mounting bolt is placed in the incoming section of the housing. Through this mounting bolt the spring force of the spring element can be set simply by tightening or loosening the mounting bolt.

In a special embodiment an adapter sleeve is disposed between the second supporting disk and the spring element, which adapter, sleeve is displaceable along the longitudinal axis. This adapter sleeve serves for the force transmission of the spring force of the spring element onto the second supporting disk. This adapter sleeve is especially suitable as anti-twist protection. Without such adapter sleeve the rotational movement of the mounting bolt would be transmitted onto the first supporting disk and the first supporting disk would be twisted with respect to the interior body which could lead to the shearing of the lines.

In a further preferred embodiment, a sleeve is provided that surrounds the interior body along the longitudinal axis as well as the two supporting disks, wherein the sleeve is disposed between the interior body and the housing. When utilizing the sleeve, it is advantageous for the two supporting disks and the interior body to be preassembled in this sleeve such that the sleeve, together with the two supporting disks and the interior body, can simply be slid into the housing.

In a further preferred embodiment, the interior body is comprised of at least two subsections. However, it is also feasible for the interior body to be comprised of granulated or powdery material.

If the interior body is comprised of several subsections either of granulate or powder, mounting the lines is facilitated.

It is also explicitly proposed to combine several characteristics of the individually described embodiments.

BRIEF DESCRIPTION OF THE DRAWINGS

In the following the present invention will be described in further detail in conjunction with the drawing.

DETAILED DESCRIPTION

Figure 1:
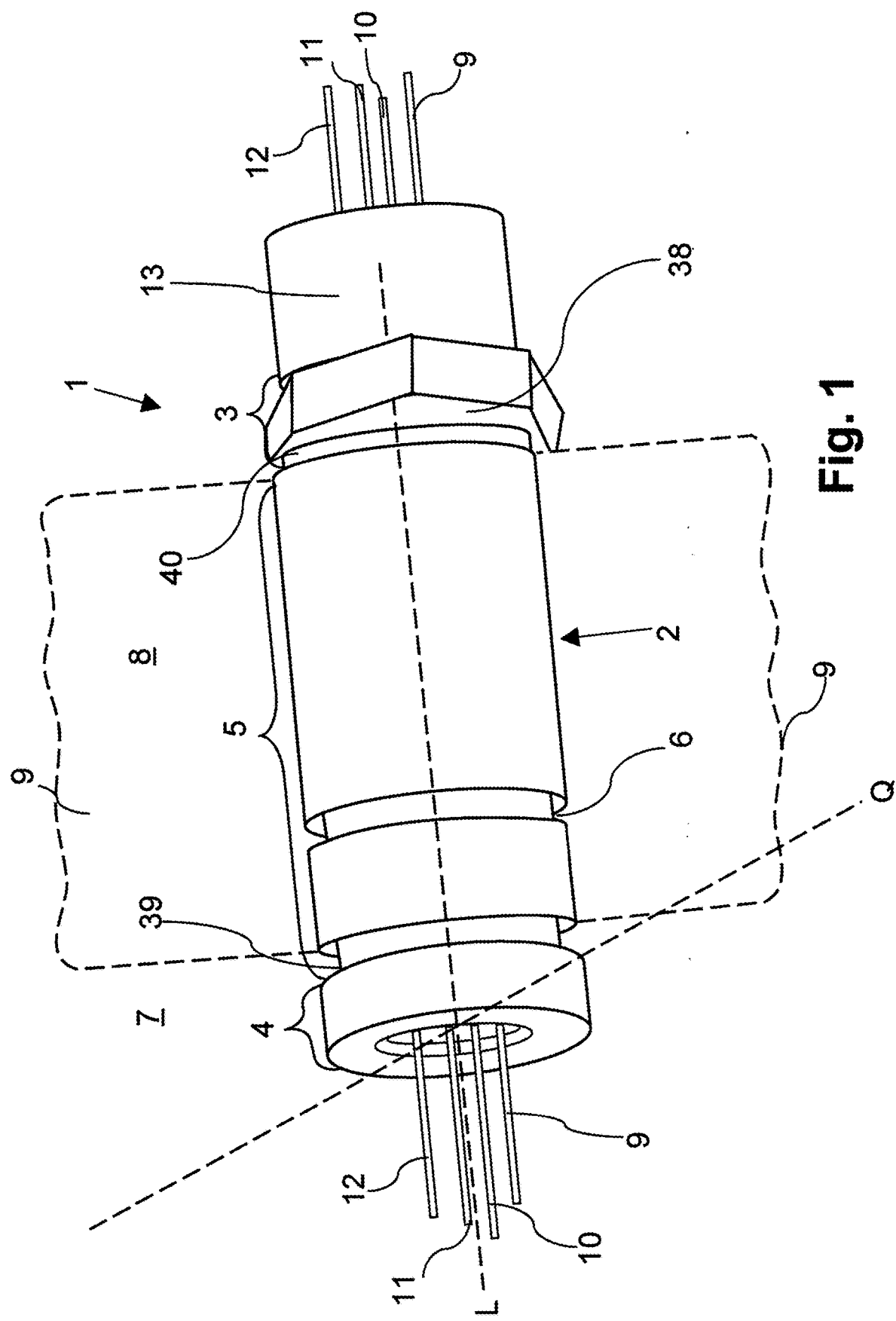
FIG. 1 is a perspective view of an explosion-protected device.

FIG. 1 is a perspective view of an explosion-protected device 1 which can be at least partially disposed in an explosion-protected region. The device 1 comprises a housing 2, comprising an incoming section 3 as well as an outgoing section 4 as well as a middle section 5 located thereinbetween. The middle section 5 includes a diminution 6 on the outside. Into this diminution 6 one sealing ring can be set, a sealing ring not being depicted here. A wall, separating an explosion-protected region 7 from an explosion-endangered region 8, is identified by the reference number 42. Therewith the outgoing section 4 is completely located within the explosion-protected region 7, whereas the middle section 5 is only partially disposed within the explosion-protected region 7. Several lines are provided which are introduced via the incoming section 3 into the housing 2 and led out again via the outgoing section 4. The device 1 in FIG. 1 includes four lines 9 to 12, wherein fewer or more lines can also be provided. The lines 9 to 12 can involve optical or electrical lines. Lines 9 to 12 can herein be fed through the housing 2 along a longitudinal axis L. The electrical lines can herein carry power into the explosion-protected region. The optical lines can be fiberglass lines with which optical measurements can be carried out in the explosion-protected region or they can also be optical lines connected to a sensor located in the explosion-protected region (not shown). However, the lines can also serve for the transmission of data. It is understood that the lines are insulated by a protective coating of a synthetic material, wherein the synthetic coating is not specifically shown, especially since such lines are commercially available.

Into the incoming section 3 a mounting bolt 13 is placed with which a spring element (not discernable) located in housing 2 can be prestressed. Along the longitudinal axis L the mounting bolt 13 has a feedthrough for lines such that the lines 9 to 12 can be fed through the mounting bolt 13.

The mounting bolt 13 can, however, also be omitted if the spring force is exerted onto the spring element in a different manner. It is for example feasible to place the spring element under prestress into the housing 2 and subsequently to emplace a cap that closes the housing 2 and through which the spring element remains prestressed. It is understood that the cap also comprises feedthroughs for lines. The housing 2 as well as the mounting bolt 13 are preferably comprised of a metal, a metal alloy or a highly reinforced synthetic material. The housing 2 or the mounting bolts 13 can, for example, be comprised of special steel or of polyetheretherketone (PEEK).

In the middle section 5 two grooves 39, 40 are provided into each of which a retainer ring can be placed in order to retain the device 1 in the wall 42. Retainer rings are not shown in FIG. 1. It is herein important that at least in groove 39 a retainer ring for retaining the device 1 in the wall 42 is provided. A retainer ring in groove 40 can thus also be omitted.

Figure 2:
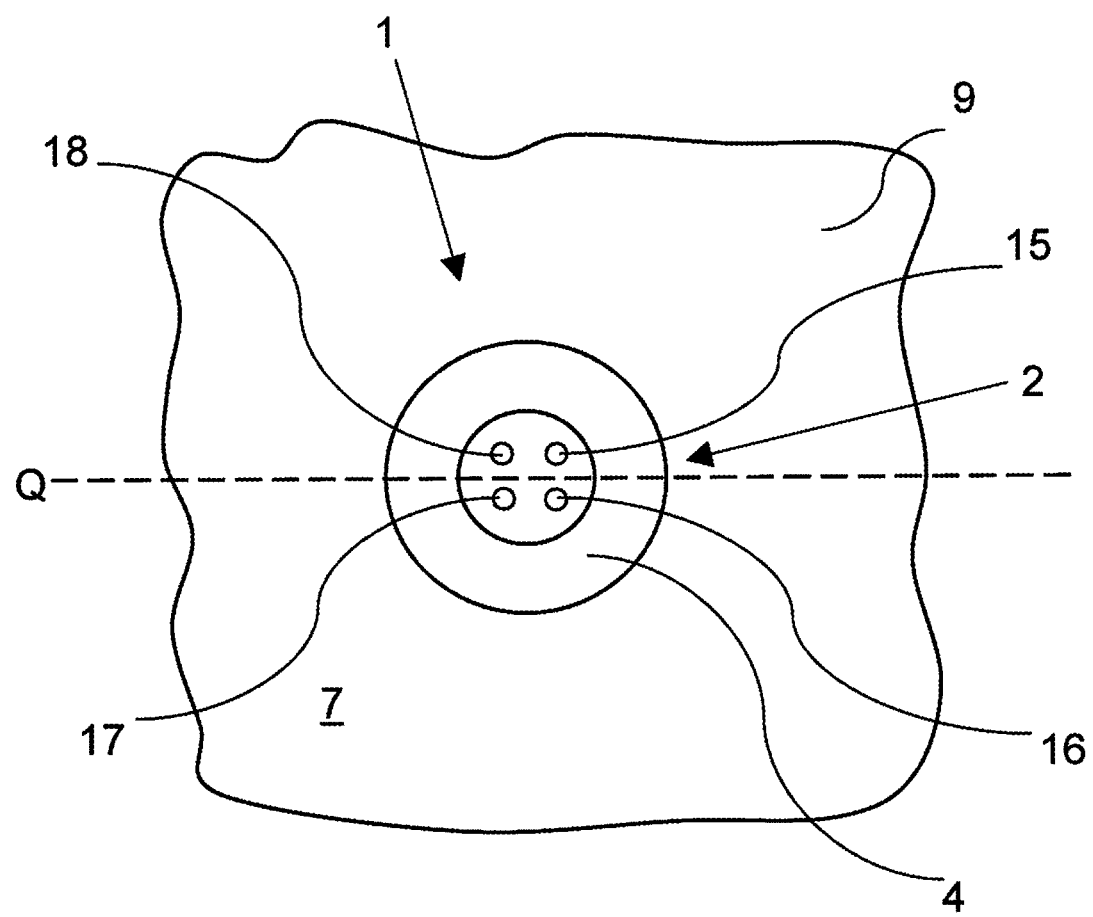
FIG. 2 is a further view of the explosion-protected device according to FIG. 1.

In FIG. 2 a further view of the explosion-protected device 1 according to FIG. 1 is shown wherein the view is directed onto the outgoing section 4 (direction of view A). The outgoing section 4 of housing 2 of device 1 is consequently located in the explosion-protected region 7 that is separated by wall 42 from the explosion-endangered region, such that this explosion-endangered region is not visible. Wall 42 is only shown sectionally in FIG. 2.

In the outgoing section 4 of housing 2 a first supporting disk 14 is provided that comprises four feedthroughs 15 to 18 through which the lines 9 to 12 (cf. FIG. 1) are fed and through which they leave the outgoing section 4 of housing 2. For clearer visibility of feedthroughs 15 to 18, the lines are not shown in FIG. 2. This first supporting disk 14 is disposed in housing 2 along a transverse axis Q.

Figure 3:
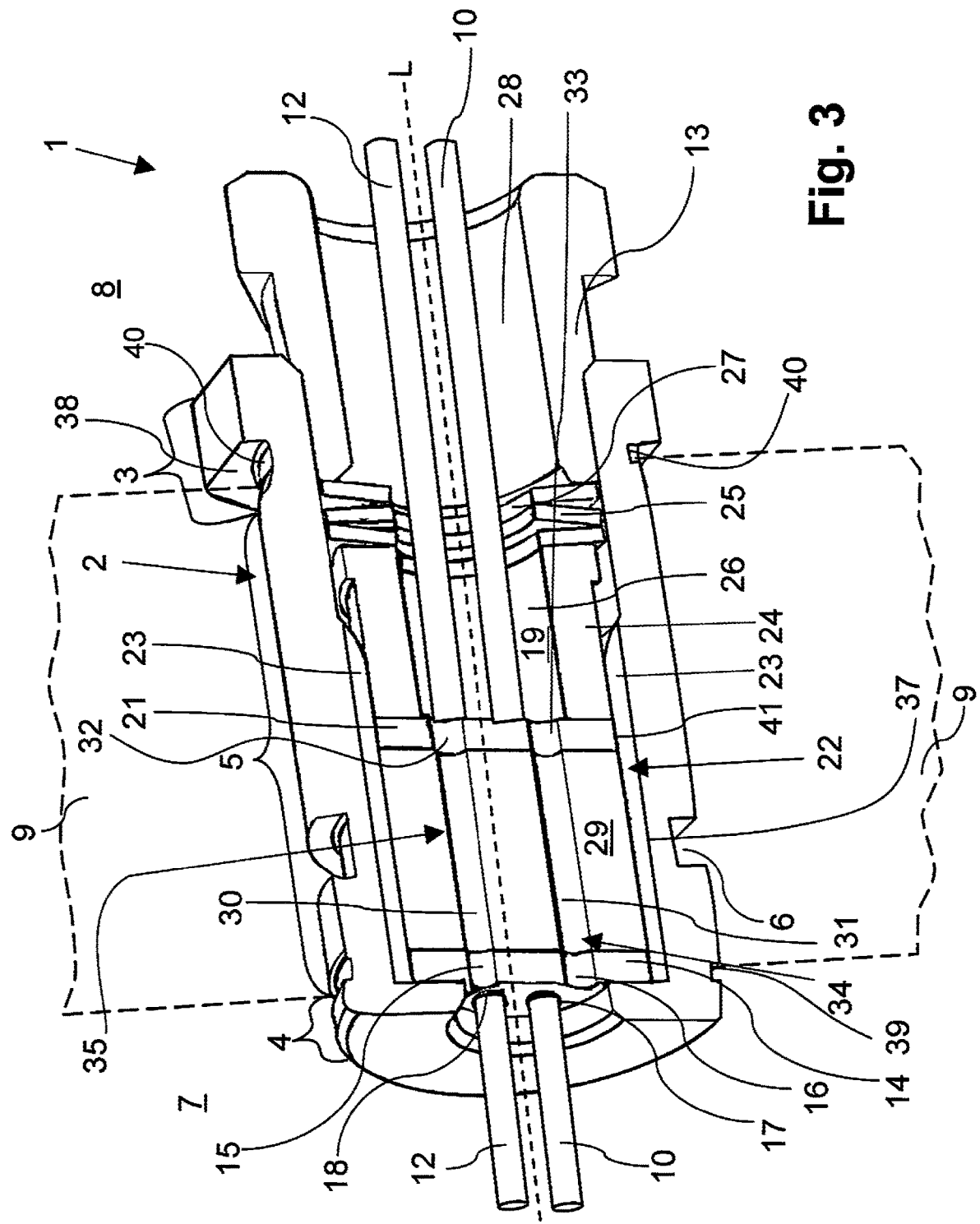
FIG. 3 is a longitudinal section through the explosion-protected device according to FIG. 1.

FIG. 3 represents a longitudinal section through the explosion-protected device 1 according to FIG. 1 such that an interior region 19 of housing 2 can be discerned. Adjoining the supporting disk 14 disposed in the outgoing section 4 is a deformable interior body 20 and adjoining thereon is a second supporting disk 21 such that the interior body 20 is surrounded by both supporting disks 14, 21. The interior body 20 as well as the second supporting disk 21 are disposed in the middle section 5 of housing 2.

Between the interior region 19 of housing 2 and an arrangement 22 comprising the two supporting disks 14, 21 and the interior body 20, a sleeve 23 is disposed. However, the use of a sleeve 23 means that an additional structural part has to be utilized. Sleeve 23 can therefore also be omitted whereby the arrangement 22 is in direct contact with the housing 2.

By means of the longitudinal section L two feedthroughs 15, 16 of the first supporting disk 14 and two feedthroughs 32, 33 of the second supporting disk 21 as well as two line channels 30, 31 of the interior body 20 are discernable. The feedthroughs 16, 33 and the line channel 31 form a feedthrough channel 34 and the feedthroughs 15, 32 and the line channel 30 form a feedthrough channel 35. In order to make the feedthrough channels 34, 45 visible, lines 9, 11 were not depicted. The lines 10 or 12 are fed through two further feedthrough channels (not discernable) of interior body 20.

A soft synthetic material is suitable as the material for sleeve 23.

The two supporting disks 14, 21 can be comprised of a synthetic material, a metal or a metal alloy. The interior body 20 is comprised of a plastic, readily deformable material, for example graphite or synthetic material.

The middle section 5 comprises a diminution 6 in an exterior region, into which a not shown sealing element, appropriate for the desired IP class, [can be placed] to seal a gap between wall 42 and housing 2. Wall 42, only depicted schematically, separates the explosion-protected region 7 from the explosion-endangered region 8. The outgoing section 4 is located completely within the explosion-protected region 7, whereas the middle section 5 is only partially disposed in the explosion-protected region 7.

Figure 4:
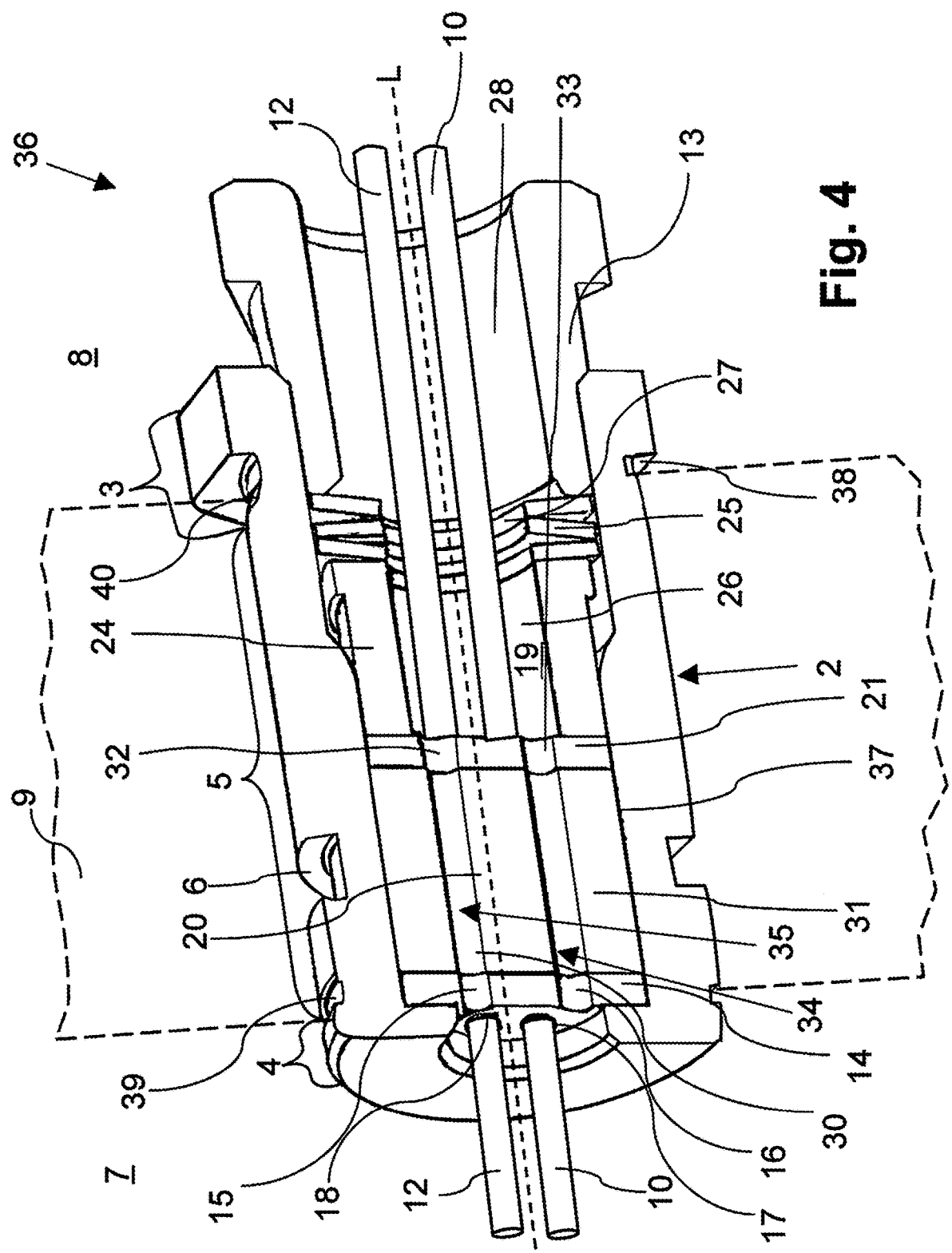
FIG. 4 shows a variant of the explosion-protected device according to FIG. 3.

A displaceable adapter sleeve 24 is provided that is disposed between the second supporting disk 21 and the spring element 25. Into the incoming section 3 of housing 2 is placed a mounting bolt 13 with which the spring element 25 can be prestressed. As do the spring element 25 and the adapter sleeve 24, the mounting bolt 13 includes along the longitudinal axis L a central feedthrough 26, 27 or 28 for lines, such that the lines can be guided through the mounting bolt 13, spring element 25 and adapter sleeve 24. In FIG. 4 only the two lines 10 and 12 are depicted. It is also conceivable to feed the lines already in the region of the adapter sleeve 24 laterally through feedthroughs (not shown). In this case spring elements and mounting bolts without a central feedthrough could also be utilized.

The adapter sleeve 24 serves for the force transmission of the spring force of spring element 25 onto the second supporting disk 21 and for the anti-twist protection. For this purpose the adapter sleeve 24 is disposed such that it is displaceable along the longitudinal axis L. Since the second supporting disk 21 and the adapter sleeve 24 are disposed displaceably along the longitudinal axis L in sleeve 23, the adapter sleeve 24 is slid through the spring force of the spring element 25 onto the second supporting disk 21, wherein the supporting disk 21, in turn, transmits the force onto the deformable interior body 20. This ensures that with undesirable deformations of the interior body 20—expressly at low temperatures or under strong temperature fluctuations—the spring element 25 and the second supporting disk 21 press further onto the interior body 20 whereby the interior body 20 continues to remain completely in contact with the sleeve 23 or with the supporting disks 14, 21 and the lines and consequently completely fills an interior volume 29 between the two supporting disks 14, 21. The spring element 25 must therefore be implemented such that it can completely compensate the differences in thermal expansion between sleeve 23 and interior body 20 and can, even at very low temperatures, still transmit sufficient force in order to plastically deform the interior body 20. For the anti-twist protection, a bore 43 can, for example, be provided in the periphery of housing 2 into which a pin 44 is pressed. This pin 44 extends through a feedthrough 46 provided in sleeve 23 and lastly engages into a groove 45 of adapter sleeve 24. In this way, the adapter sleeve 24 can be axially displaced, however, it can no longer rotate. Further implementations with pins, fitted keys or special non-circular profiles of the adapter sleeve 24 and the associated bore 43 in housing 2 are technically also feasible.

The adapter sleeve 24 could also be omitted. In this case an anti-twist safeguard would have to be provided on the spring element 25 or on the second supporting disk 21. Alternatively, an anti-twist safeguard could also be utilized that has a structure different from the adapter sleeve 24. However, this is not shown in FIG. 2.

In FIG. 3 the interior body 20 is shown as a one-part structure. It is, however, also feasible for the interior body 20 to be subdivided in the axial direction such that it is comprised of several subsections. In the case of four lines, the interior body 20 is preferably comprised of two subsections. If the interior body 20 is comprised of several subsections, mounting the lines is facilitated. It is however also conceivable for the interior body 20 to be comprised of synthetic granulate or synthetic powder, wherein in this case sealing against the loss of granulate and especially of powder is required.

For the assembly of the explosion-protected device 1, the lines 9 to 12 are first placed into the interior body 20 and subsequently the two supporting disks 14, 21 are set onto the interior body 20 such that the arrangement 22 is obtained. The sleeve 23 is subsequently slid into the housing 2 and the arrangement 22 placed in such manner that the sleeve 23 is disposed between housing 2 and arrangement 22. The adapter sleeve 24 is subsequently slid into housing 2 and the spring element 25 is introduced such that the adapter sleeve 24 is disposed between the arrangement 22 and spring element 25. Lastly, the mounting bolt 13 is tightened with a previously determined torque such that the maximal spring force of the spring element 25 is exceeded. The interior body 20 is thereby so deformed that the interior body 20 is in complete contact on an interior wall 41 of sleeve 23 as well as also on lines 9 to 12 and thus fills out the entire interior volume 29. The mounting bolt 13 is lastly turned back by a defined angle, stated differently, it is loosened again in order to create a volume for a possible temperature expansion of the interior body 20. The mounting bolt 13 is preferably turned back counterclockwise by an angle of 90° to 180°.

FIG. 4 shows a variant of the explosion-protected device depicted in FIG. 3. In contrast to the device 1, this device 36 does not include a sleeve such that the device 36 corresponds substantially to device 1. For this reason the reference numbers of the individual structural parts were retained.

The two supporting disks 14, 21 and the interior body 20 have herein a greater cross section such that the supporting disks 14, 21 as well as the interior body 20 are in direct contact on an interior wall 37 of housing 2. The spring element 25 ensures that at undesirable deformations of the interior body—in particular at low temperatures or under strong temperature fluctuations—the second supporting disk 21 is continuously shifted in the direction of the interior body 20 and consequently presses onto the interior body 20 whereby the interior body 20 remains completely in contact with the housing 2, the lines as well as the supporting disks 14, 21 and consequently fills completely an interior volume 29 formed by the two supporting disks 14, 21 and a portion of the interior wall 37 of housing 2.

For an anti-twist protection, the bore 43 is provided in the periphery of housing 2 into which pin 44 is pressed. This pin 44 engages directly into groove 45 of adapter sleeve 24 since no sleeve 23 is provided. In this way, the adapter sleeve 24 can be axially displaced but can no longer rotate. Further implementations with pins, fitted keys or special non-circular profiles of the adapter sleeve 24 and the associated bore 43 in the housing 2 are also technically feasible.

The synthetic insulated lines 9 to 12 of device 1 or of device 36 are consequently sufficiently sealed off from the surrounding during the feedthrough through housing 2.

The explosion-protected device 1 or 36 therefore satisfies the requisite criteria of compressive strength, temperature stability, UV resistance, cold impact resistance as well as chemical stability and resistance and thus complies with the requirements of Standard UL 1203. Herein spring elements of any type can be utilized. Advantageous are herein such spring elements that are not elastomeric. For example, metal spring elements, for example plate springs of steel, are suitable.

The devices 1 and 36 comprise four feedthrough channels, with which these two devices 1 and 36 have only four lines. A person of skill in the art understands that these devices can also include less than four, for example three or more than four feedthrough channels, for example six or eight, in order to be able to comprise thereby correspondingly more or fewer lines.

The words "example" and "exemplary" as used herein mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

LIST OF REFERENCE

1 Explosion-protected device
2 Housing
3 Incoming section
4 Outgoing section
5 Middle section
6 Diminution
7 Explosion-protected region
8 Explosion-endangered region
9-12 Lines
13 Mounting bolt
14 First supporting disk
15-18 Feedthroughs
19 Interior region of housing 2
20 Deformable interior body
21 Second supporting disk
22 Arrangement
23 Sleeve
24 Adapter sleeve
25 Spring element
26-28 Feedthroughs
29 Interior volume
30, 31 Line channels
32, 33 Feedthroughs
34, 35 Feedthrough channels
36 Explosion-protected device
37 Interior wall
38 - - - -
39 Groove
40 Groove
41 Interior wall
42 Wall
43 Bore
44 Pin
45 Groove
46 Feedthrough
L Longitudinal direction
Q Transverse direction

What is claimed is:

1. An explosion-protected device (1, 36), comprising:
a deformable interior body (20);
a line channel (30, 31) extending along a longitudinal axis (L) through the interior body (20), wherein the line channel (30, 31) is configured to receive a line (9 to 12);
a housing (2) which encompassed the interior body (20), wherein the housing (2) comprises
an incoming section (3) for the line (9 to 12),
an outgoing section (4) for the line (9 to 12), and
a middle section (5) located between the incoming section (3) and the outgoing section (4);
a spring element (25) disposed in the middle section (5) which exerts pressure onto the interior body (20), the pressure being of sufficient magnitude to deform the interior body (20);
a first supporting disk (14) with a feedthrough (15 to 18) extending along the longitudinal axis (L) for the line (9 to 12) arranged to abut a first end of the interior body (20) facing the outgoing section (4);
a second supporting disk (21) with a feedthrough (32, 33) extending along the longitudinal axis (L) for the line (9 to 12) arranged to abut a second end of the interior body (20) facing the incoming section (3); and
a rigid adapter sleeve (24) disposed between the second supporting disk (21) and the spring element (25), the adapter sleeve (24) being displaceable along the longitudinal axis (L).

2. The explosion-protected device (1, 36) as in claim 1, wherein the feedthrough (15 to 18) of the first supporting disk (14), the feedthrough (32, 33) of the second supporting disk (21), and the line channel (30, 31) of the interior body (20) joinly form a feedthrough channel (34, 35) configured to receive the line (9 to 12).

3. The explosion-protected device (1, 36) as in claim 1, wherein the second supporting disk (21) is disposed in the middle section (5) and the first supporting disk (14) is disposed in the outgoing section (4).

4. The explosion-protected device (1, 36) as in claim 1, further comprising a mounting bolt (13) which is disposed in the incoming section (3) of housing (2) and with which the spring force of the spring element (25) can be adjusted.

5. The explosion-protected device (1, 36) as in claim 1, further comprising a sleeve (23) which surround the interior body (20) and the two supporting disks (14, 21) along the longitudinal axis (L),
wherein the sleeve (23) is disposed between the interior body (20) and the housing (2).

6. The explosion-protected device (1, 36) as in claim 1, wherein the interior body (20) comprises at least two subsections.

7. The explosion-protected device (1, 36) as in claim 1, wherein the interior body (20) comprises a granulated or a powdery material.

8. The explosion-protected device (1, 36) as in claim 1, wherein the rigid adapter sleeve (24) is prevented from rotating by an anti-twist protection.

9. The explosion-protected device (1, 36) as in claim 1, wherein the rigid adapter sleeve comprises a groove into which a pin engages, thereby allowing the adapter sleeve to be axially displaced but unable to rotate.

* * * * *